(12) United States Patent
Kuroda et al.

(10) Patent No.: US 7,387,766 B2
(45) Date of Patent: *Jun. 17, 2008

(54) EXHAUST-GAS PURIFYING APPARATUS

(75) Inventors: Kazuhiro Kuroda, Kakegawa (JP); Masayasu Sato, Kakegawa (JP); Yasuo Kato, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 661 days.

This patent is subject to a terminal disclaimer.

(21) Appl. No.: 10/656,178

(22) Filed: Sep. 8, 2003

(65) Prior Publication Data

US 2004/0096374 A1   May 20, 2004

(30) Foreign Application Priority Data

Nov. 19, 2002  (JP) ............................ 2002-335424

(51) Int. Cl.
    *B01D 50/00* (2006.01)
(52) U.S. Cl. ...................................... 422/177; 422/180
(58) Field of Classification Search ................ 422/168; 431/7; 181/236, 238, 249
    See application file for complete search history.

(56) References Cited

U.S. PATENT DOCUMENTS 4,203,502 A * 5/1980 Strader ...................... 181/238
4,402,662 A * 9/1983 Pfefferle ....................... 431/7

FOREIGN PATENT DOCUMENTS

| JP | A 9-228832 | 2/1997 |
| JP | A 9-317452 | 9/1997 |
| TW | 354609 | 3/1999 |

* cited by examiner

*Primary Examiner*—Glenn Caldarola
*Assistant Examiner*—Tom Duong
(74) *Attorney, Agent, or Firm*—Oliff & Berridge, PLC

(57) ABSTRACT

An exhaust-gas purifying apparatus includes a mantle, a support, and a catalytic layer. The support is disposed in the mantle, and is formed as at least one shape selected from the group consisting of cylinder shapes and corrugated shapes. The catalytic layer is loaded on at least one of the surfaces of the support. Moreover, the support includes at least two support elements disposed in the axial direction of the mantle, and the two support elements neighboring in the axial direction of the mantle are disposed out of phase with each other in the peripheral direction of the mantle. The exhaust-gas purifying apparatus shows not only an enhanced exhaust-gas purifying ability but also high misfire resistance.

4 Claims, 4 Drawing Sheets

EXHAUST-GAS PURIFYING APPARATUS

BACKGROUND OF THE INVENTION

1. Field of the Invention

The present invention relates to an exhaust-gas purifying apparatus.

2. Description of the Related Art

In order to purify exhaust gases emitted from automobiles and motorcycles, exhaust-gas purifying apparatuses have been used. There are many types of exhaust-gas purifying apparatuses such as thermal reactor-system, lean burning-system, engine modification-system, and catalyst-system exhaust-gas purifying apparatuses. Among them, catalyst-system exhaust-gas purifying apparatuses have been used extensively.

Catalyst-system exhaust-gas purifying apparatuses purify exhaust gases by using catalytic precious metals such as Pt, Rh and Pd. In catalyst-system exhaust-gas purifying apparatuses, exhaust-gas purifying catalysts are used which are made in the following manner. A catalytic layer is formed on a surface of a catalyst support with activated alumina such as γ-alumina. Then, one or more catalytic precious metals are loaded on the catalytic layer.

As for the materials of catalyst supports, heat-resistant materials are used because catalyst supports are exposed to high-temperature exhaust gases. As such materials, it is possible to name ceramics, such as cordierite, heat-resistant metals, such as stainless steels.

Catalyst supports made of ceramics suffer from such disadvantages that they are susceptible to mechanical shocks and exhibit large emission resistance. Accordingly, catalyst supports made of metals have come to be used due to the reasons that the pressure loss of exhaust systems should be reduced or the heat resistance of catalyst supports should be improved.

An exhaust-gas purifying apparatus provided with a metallic catalyst support can be manufactured in the following manner, for example. A steel stock is rolled as a foil-shaped or sheet-shaped workpiece. The steel stock can be SUS304 (as per Japanese Industrial Standard (JIS), i.e., 18Cr-8Ni austenic stainless steel), or SUS430 (as per JIS, i.e., 16Cr ferritic stainless steel). The resulting foil-shaped or sheet-shaped workpiece is processed into a metallic catalyst support. Then, a catalytic layer is formed on a surface of the resultant metallic catalyst support. Finally, one or more catalytic precious metals are loaded on the catalytic layer. Thus, an exhaust-gas purifying apparatus provided with a metallic catalyst support is completed.

Depending on the shapes of catalyst supports, exhaust-gas purifying apparatuses can be divided into monolithic, granular, honeycomb-shaped and pipe-shaped exhaust-gas purifying apparatuses.

In honeycomb-shaped exhaust-gas purifying apparatuses, there is a problem in that metallic catalyst supports might be melted by misfires which are transmitted from internal combustion engines. Specifically, when metallic catalyst supports are melted, the effective loading amount of catalytic precious metals might be decreased, or honeycomb-shaped cells might be clogged to lower the exhaust-gas purifying ability of honeycomb-shaped exhaust-gas purifying apparatuses.

Moreover, in pipe-shaped exhaust-gas purifying apparatuses, the axial length should be prolonged in order to secure a desirable exhaust-gas purifying ability. Accordingly, the boardability problem might associate with pipe-shaped exhaust-gas purifying apparatuses. In addition, when the axial length of pipe-shaped exhaust-purifying apparatuses is prolonged, the exhaust-gas temperature might be dropped to lower the exhaust-gas purifying ability of pipe-shaped exhaust-gas purifying apparatuses.

Consequently, pipe-shaped exhaust-gas purifying apparatuses have been developed whose axial length is shortened. For example, Japanese Unexamined Patent Publication (KOKAI) No. 9-228,832 and Japanese Unexamined Patent Publication (KOKAI) No. 9-317,452 propose such a pipe-shaped exhaust-gas purifying apparatus.

Japanese Unexamined Patent Publication (KOKAI) No. 9-228,832 discloses a catalytic converter in which a metallic support, manufactured by winding a corrugated metallic plate, is fitted into a mantle.

Japanese Unexamined Patent Publication (KOKAI) No. 9-317,452 discloses an exhaust-gas purifying apparatus in which a plurality of minor-diameter pipes are disposed in a major-diameter pipe.

However, the catalyst converter and exhaust-gas purifying apparatus disclosed in the publications have a problem in that exhaust gases passing through the mantle and major-diameter pipe do not fully contact with the metallic support and minor-diameter pipes. Specifically, their exhaust-gas purifying abilities are insufficient. To be more precise, since the metallic support and minor-diameter pipes are disposed along the flow of exhaust gases, exhaust gases are less like to contact with the catalyst loaded on the metallic support and minor-diameter pipes when they pass through the inside of the mantle and major-diameter pipe.

SUMMARY OF THE INVENTION

The present invention has been developed in view of the aforementioned circumstances. It is therefore an object of the present invention to provide an exhaust-gas purifying apparatus which shows a high purifying ability.

The inventors of the present invention repeated the study on exhaust-gas purifying apparatuses which provided a large area contacting with respect to exhaust gases. As a result, they found out that it is possible to achieve the object set forth above when a support is disposed in a multi-staged manner in the flow direction of exhaust gases. Thus, they completed the present invention.

For example, an exhaust-gas purifying apparatus according to the present invention comprises:
- a mantle;
- a support disposed in the mantle, and formed as at least one shape selected from the group consisting of cylinder shapes and corrugated shapes; and
- a catalytic layer loaded on at least one of the surfaces of the support;
- wherein the support comprises at least two support elements disposed in the axial direction of the mantle, and the two support elements neighboring in the axial direction of the mantle are disposed out of phase with each other in the peripheral direction of the mantle.

In the present exhaust-gas purifying apparatus, the support comprises at least two support elements disposed in the axial direction of the mantle, and the two support elements neighboring in the axial direction of the mantle are disposed out of phase with each other in the peripheral direction of the mantle. Accordingly, exhaust gases passing through the inside of the mantle are likely to contact with the surface of the support elements. Specifically, the support element disposed on the upstream side of exhaust gases disturb the flow of exhaust gases, and the disturbed flow of exhaust gases contacts with the support element disposed on the downstream side of exhaust gases. As a result, the present exhaust-gas purifying apparatus can show a high exhaust-gas purifying ability.

Moreover, when the thickness of the support formed as a cylinder shape or corrugated shape is thickened, it is possible to improve the misfire resistance of the present exhaust-gas purifying apparatus. Note that it is preferable to control the thickness of the support formed as a cylinder shape or corrugated shape 0.3 mm or more, further preferably in a range of from 0.3 to 1.0 mm.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
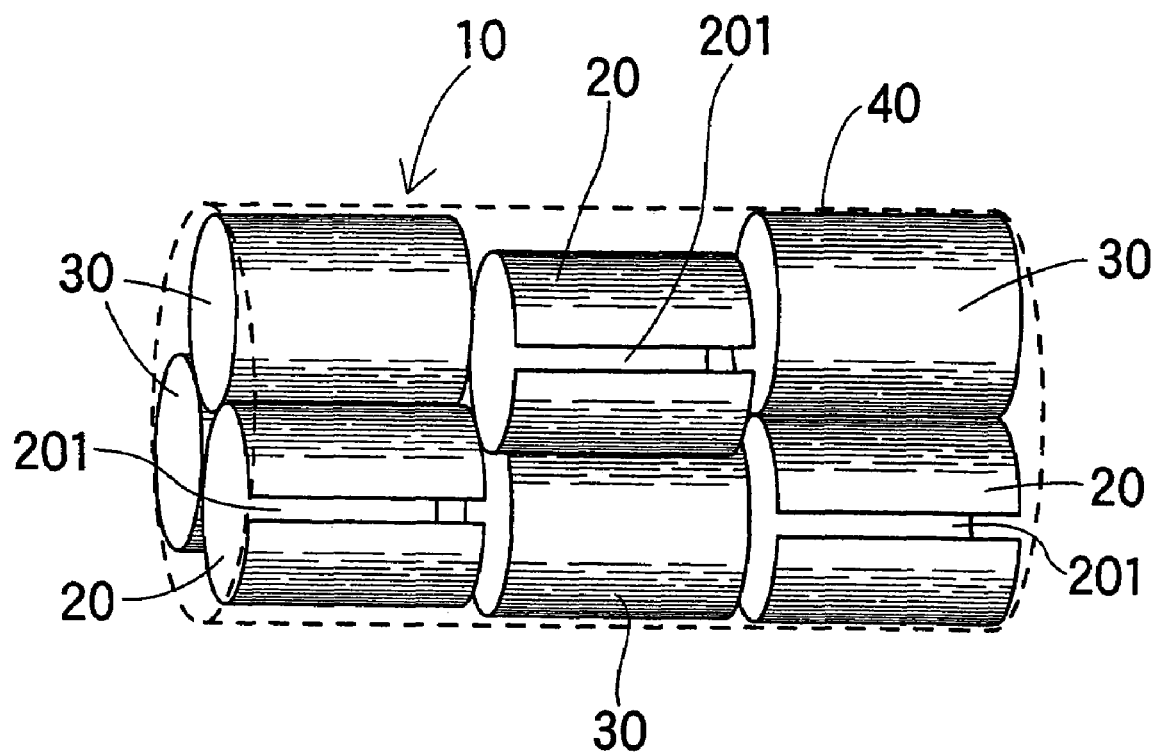
FIG. 1 is a drawing for illustrating the arrangement of an exhaust-gas purifying apparatus according to Example No. 1 of the present invention.

Having generally described the present invention, a further understanding can be obtained by reference to the specific preferred embodiments which are provided herein for the purpose of illustration only and not intended to limit the scope of the appended claims.

The present exhaust-gas purifying apparatus comprises a mantle, a support, and a catalytic layer. The support is disposed in the mantle, and is formed as at least one shape selected from the group consisting of cylinder shapes and corrugated shapes. The catalytic layer is loaded on at least one of the surfaces of the support. In the present exhaust-gas purifying apparatus, the catalytic layer purifies exhaust gases which pass through the inside of the mantle.

In the present exhaust-gas purifying apparatus, the support comprises at least two support elements disposed in the axial direction of the mantle. The two support elements neighboring in the axial direction of the mantle are disposed out of phase with each other in the peripheral direction of the mantle.

When the support comprises at least two support elements disposed in the axial direction of the mantle, the loading amount of the catalytic layer increases. Accordingly, the present exhaust-gas purifying apparatus is improved in terms of the exhaust-gas purifying ability.

The two support elements neighboring in the axial direction of the mantle are disposed out of phase with each other in the peripheral direction of the mantle. Note that "the support elements disposed out of phase with each other" designates that each of the support elements has a different vertical cross-section taken vertically with respect to the axial direction of the mantle. Moreover, the relative cross-sections can disagree with each other in the support elements, respectively. Specifically, when a plurality of the support elements have an identical relative cross-section with each other, at least two support elements are disposed so that they are rotated around the axis of the mantle, or they are disposed so that they are inverted upside down with respect to each other. To be more precise, in the present exhaust-gas purifying apparatus, the support comprises at least two support elements neighboring in the axial direction of the mantle, and having a cross-section formed as a shape differing with each other respectively when taken vertically with respect to the axial direction of the mantle. Accordingly, the support element disposed on the upstream side of exhaust gases disturbs the flow of exhaust gases, and the disturbed flow of exhaust gases contacts with the support element disposed on the downstream side of exhaust gases. As a result, the present exhaust-gas purifying catalyst can show a high exhaust-gas purifying ability.

The support can preferably comprise three or more support elements, and the three or more support elements can preferably be disposed out of phase with each other in the peripheral direction of the mantle. When a plurality of the support elements are disposed out of phase with each other in the peripheral direction of the mantle, the present exhaust-gas purifying apparatus can show a much higher exhaust-gas purifying ability.

When the support comprises a plurality of the support elements, the distance between the neighboring support elements is not limited in particular. Specifically, the support elements can be disposed at predetermined intervals, or can be contacted with each other with the axial end surfaces.

When the support elements are disposed at predetermined intervals, the support elements disposed on the upstream side of exhaust gases can disturb the flow of exhaust gases greatly, and the greatly disturbed flow of exhaust gases can contact with the support elements disposed on the downstream side of exhaust gases. Moreover, when the support elements are disposed so as to contact with each other, the heat of the upstream-side support elements can be conducted to the downstream-side support elements so that the entire support can be heated quickly. Accordingly, the present exhaust-gas purifying apparatus is improved in terms of the exhaust-gas purifying ability immediately after starting combustion engines.

In the present exhaust-gas purifying apparatus, the catalytic layer is loaded on at least one of the surfaces of the support. Thus, it is possible to secure the exhaust-gas purifying ability of the present exhaust-gas purifying apparatus by loading the catalytic layer on at least one of the surfaces of the support. Note that, in the present exhaust-gas purifying apparatus, it is satisfactory as far as the catalytic layer is loaded on at least one of the surfaces of the support. Moreover, in addition to the surfaces of the support, a catalytic layer can be further loaded on an inner peripheral surface of the mantle.

The support elements can preferably be made of a corrugated plate having a cross-section formed as at least one shape selected from the group consisting of letter "S" shapes and letter "U" shapes. When the support elements are made of such a corrugated plate, it is possible to provide the support with a large superficial area. Accordingly, the catalytic layer can be loaded over a large superficial area. Consequently, the present exhaust-gas purifying apparatus can show a much higher exhaust-gas purifying ability.

Note that the letter "S" shapes designate cross-sectional shapes having two apexes which protrude in opposite directions when taken vertically with respect to the axial direction of the mantle, and include letter "Z"-shaped cross-sections as well. Moreover, the letter "U" shapes designate cross-sectional shapes which contact with an inner peripheral surface of the mantle at the bottom end and top ends, and cannot necessarily be limited to letter "U" shapes alone. For example, the letter "U" shapes include letter "V" shapes as well as letter "W" shapes.

The support elements can preferably be made of a plurality of corrugated plates having a letter "S"-shaped cross-section. When the support elements are made of a plurality of such corrugated plates, it is possible to provide the support with a large superficial area. Accordingly, the catalytic layer can be loaded over a large superficial area. Consequently, the present exhaust-gas purifying apparatus can show a much higher exhaust-gas purifying ability. Note that the corrugated plates having a letter "S"-shaped cross-section designate corrugated plates whose cross-section has a plurality of roots and crests.

Each of the support elements can preferably comprise a support-element assembly including a plurality of cylinder-shaped support elements, and at least two of the cylinder-shaped support elements neighboring in the axial direction of the mantle can preferably contact with each other with their outer peripheral surfaces in each of the support-element assemblies. When each of the support elements comprises the support-element assembly including a plurality of cylinder-shaped support elements, it is possible to provide the support with a large superficial area. Accordingly, the catalytic layer can be loaded over a large superficial area. Consequently, the present exhaust-gas purifying apparatus can show a much higher exhaust-gas purifying ability.

At least one of the cylinder-shaped support elements in each of the support element assemblies can preferably have a ring-shaped cross-section with a cut-off, and can preferably be disposed in the mantle in such an elastically deformed state that it expands in the centrifugal direction. With such an arrangement, in at least one of the cylinder-shaped support elements, a force is exerted so that the ring-shaped cross-section, taken vertically with respect to the axial direction of the cylinder-shaped support element, expands in the centrifugal direction in the mantle. The force resulting from the cylinder-shaped support element presses the outer peripheral surface of the other neighboring cylinder-shaped support elements and/or the inner peripheral surface of the mantle. The thus pressed other cylinder-shaped support elements further press the neighboring cylinder-shaped support elements. The pressing operations are carried out successively, and thereby a plurality of the cylinder-shaped support elements are fastened in the mantle positionally.

Moreover, in the present exhaust-gas purifying apparatus, when a pair of opening ends demarcating the cut-off in the ring-shaped cross-section are brought closer to each other, or when one of the opening ends is protruded toward the axial hollow in the cylinder-shaped support element, at least one of the cylinder-shaped support elements can be disposed in the mantle with ease in such an elastically deformed state that it expands in the centrifugal direction by simply fitting the thus deformed cylinder-shaped support element into the mantle.

In at least one of the cylinder-shaped support elements, the ring-shaped cross-section with a cut-off designates that the vertical cross-section of the cylinder-shaped support element, taken vertically with respect to the axial direction, is formed as a ring shape which is cut off partially at least. It is satisfactory that the cylinder-shaped support element can be cut off partially at least in the vertical cross-section taken vertically with respect to the axial direction. The cut-off is not limited in terms of the disposition phase in the peripheral direction of the cylinder-shaped support element. Specifically, the cut-off can be formed linearly in an inclined manner with respect to the axial direction of the cylinder-shaped support assembly, or can be formed as a curve.

Moreover, in at least one of the cylinder-shaped support elements, the ring-shaped cross-section designates that the vertical cross-section of the cylinder-shaped support element, taken vertically with respect to the axial direction, forms a ring shape when the cylinder-shaped support element is free from the cut-off. Note that the ring-shaped cross-section in the cylinder-shaped support element is not limited to a complete ring shape alone, but can be formed as ellipse shapes, or even as rectangle shapes and triangle shapes.

In at least one of the cylinder-shaped support elements, the cut-off can preferably be continuous from one of the axial opposite ends of the cylinder-shaped support element to the other one of the axial opposite ends. When the cut-off is continuous, the cylinder-shaped support element is more likely to expand in the centrifugal direction.

The support elements can preferably be formed as a cylinder shape, can preferably contact with each other with their outer peripheral surfaces, and can preferably bonded with each other at the contacting outer peripheral surfaces. Moreover, when a plurality of support elements are bonded with each other at the contacting outer peripheral surfaces, they are inhibited from displacing positionally with respect to each other, and are inhibited from coming off from the neighboring support elements. As a result, it is possible to inhibit the catalytic layer loaded on at least one of the inner peripheral and outer peripheral surfaces of the support elements from being damaged, and thereby it is possible to inhibit the exhaust-gas purifying ability of the catalytic layer from degrading.

The support elements can preferably contact with and be bonded to an inner peripheral surface of the mantle. With the arrangement, the support elements are inhibited from displacing positionally in the mantle, and are inhibited from coming off from the mantle.

The mantle and/or the support elements can preferably be metallic. When the mantle and support elements are made of a metal, it is easy to bond the mantle with the support elements. Moreover, when the mantle and support elements are made of a metal, the present exhaust-gas purifying apparatus is likely to be heated by exhaust gases, and thereby the catalytic ability of the catalytic layer can be effected quickly immediately after internal combustion engines are started. The metallic material making the mantle and support elements is not limited in particular. Accordingly, it is possible to use conventionally known metallic materials.

The support elements can preferably be formed of a perforated steel plate having a plurality of through holes. When the support elements are formed of such a perforated steel plate, it is provided with holes. When exhaust gases pass through the holes, the exhaust gases are more likely to contact with the catalytic layer, and thereby the exhaust-gas purifying ability of the present exhaust-gas purifying apparatus can be enhanced.

The mantle can preferably be an exhaust pipe. When the mantle is an exhaust pipe, it is possible to purify exhaust gases by simply passing exhaust gases through the inside of the mantle.

In the present exhaust-gas purifying apparatus, it is possible to use conventionally known catalytic layers for the catalytic layer. The catalytic layer can preferably comprise a catalytic layer, and a catalytic ingredient loaded on the catalytic layer.

In exhaust-gas purifying catalysts, catalytic layers enlarge the contacting area with respect to exhaust gases. In the present exhaust-gas purifying apparatus, it is possible to use heat-resistant inorganic oxides, which have been used in ordinary exhaust-gas purifying catalysts, for the catalytic layer. For example, the catalytic layer can preferably comprise a heat resistant inorganic oxide whose major component is activated alumina. Moreover, the catalytic layer can preferably further comprise cerium oxide and/or zirconium oxide. When the catalytic layer comprises the oxides, the present exhaust-gas purifying apparatus is upgraded in terms of the exhaust-gas purifying characteristic. In addition, the thickness of the catalytic layer is not limited in particular, but can be controlled appropriately depending on the usage of the present exhaust-gas purifying apparatus.

The catalytic ingredient is loaded on the catalytic layer. The catalytic ingredient can be loaded on the catalytic layer after the catalytic layer is formed, or can be included in the catalytic layer simultaneously with the formation of the catalytic layer by mixing the catalytic ingredient with a slurry composed of activated alumina and by coating the resulting mixture slurry on at least one of the surfaces of the support. In exhaust-gas purifying catalysts, catalytic ingredients are components which purify exhaust gases. Accordingly, it is possible to use catalytic ingredients, which have been used in ordinary exhaust-gas purifying catalysts, for the catalytic ingredient. For instance, it is possible to use either one of oxidizing catalysts, reducing catalysts and 3-way catalysts.

Specifically, when at least one member selected from the group consisting of platinum (Pt), palladium (Pd) and rhodium (Rh) is used for the catalytic ingredient, it is possible to efficiently purify carbon monoxide (CO), hydrocarbons (HC) and nitrogen oxides ($NO_x$). Moreover, the loading amount of the catalytic ingredient is not limited in particular, but can be controlled appropriately depending on the usage of the present exhaust-gas purifying apparatus.

EXAMPLES

Hereinafter, the present invention will be described in more detail with reference to specific examples. Pipe-shaped exhaust-gas purifying apparatuses, examples of the present invention, were manufactured as described below.

Example No. 1

First of all, a cylinder-shaped support 20 whose axially vertical cross-section was formed as a letter "C" shape was manufactured in the following manner. A round pipe was prepared. The round pipe had an outside diameter of ϕ 19 mm, a length of 90 mm and a thickness of 0.6 mm, and was composed of SUS304 (as per JIS). The round pipe was cut off at a portion in the peripheral wall continuously in the axial direction, thereby forming an opening 201. Note that the opening 201 had a peripheral length of 2 mm. The peripheral length can preferably be from $1/100$ to $10/100$, further preferably from $1/100$ to $5/100$, of the entire peripheral length of the round pipe or cylinder-shaped support 20.

Then, two cylinder-shaped supports 30, 30 whose axially vertical cross-section was formed as a ring were prepared. The cylinder-shaped supports 30, 30 had an outside diameter of ϕ 19 mm, a length of 90 mm and a thickness of 0.6 mm, and were composed of SUS304 (as per JIS). Moreover, a mantle 40 was prepared. The mantle 40 had an outside diameter of ϕ 42.7 mm, a length of 90 mm and a thickness of 1.2 mm, and was composed of SUS304 (as per JIS) Together with the cylinder-shaped support 20 whose axially vertical cross-section was formed as a letter "C" shape, the two cylinder-shaped supports 30, 30 whose axially vertical cross-section was formed as a ring shape were fitted into the mantle 40. When the three cylinder-shaped supports 20, 30 and 30 were fitted into the mantle 40, they were disposed in the middle of the mantle 40 in the axial direction of the mantle 40.

Moreover, two sets of the cylinder-shaped supports 20, 30 and 30 were prepared. Specifically, a set of the cylinder-shaped support 20, 30 and 30 comprised a cylinder-shaped support 20 whose axially vertical cross-section was formed as a letter "C" shape, and two cylinder-shaped supports 30, 30 whose axially vertical cross-section was formed as a ring shape. One of the sets was fitted into the mantle 40 from one of the opposite opening ends of the mantle 40. The other one of the sets was fitted into the mantle 40 from the other one of the opposite opening ends of the mantle 40. When the three sets of the cylinder-shaped supports 20, 30 and 30 were fitted into the mantle 40, they were disposed out of phase, or their disposition phases did not agree with each other in the mantle 40. Specifically, the three sets of the cylinder-shaped supports 20, 30 and 30 were disposed in the mantle 40 so that their axial dispositions did not agree with each other in the mantle 40. In other words, the three sets of the cylinder-shaped supports 20, 30 and 30 were disposed in a staggered manner in the axial direction of the mantle 40. In addition, the sets of the cylinder-shaped supports 20, 30 and 30, disposed at axially different positions in the mantle 40, contacted with the neighboring sets with the axial ends.

Subsequently, the respective contacts between the three cylinder-shaped supports 20, 30 and 30 and the mantle 40 were brazed with an Ni brazing alloy. By the brazing, the three cylinder-shaped supports 20, 30 and 30 and the mantle 40 were bonded.

In the meantime, a slurry was prepared by uniformly mixing activated alumina, a Ce—Zr composite oxide, a binder, Pt, Rh and water. The activated alumina was γ-$Al_2O_3$, and was used in an amount of 57.6 parts by weight. The Ce—Zr composite oxide was used in an amount of 32.4 parts by weight. Note that the amount of the Ce—Zr composite oxide could be 27.5 parts by weight by conversion into $CeO_2$. The binder was used in an amount of 5.8 parts by weight. Pt was used in an amount of 3.6 parts by weight. Rh was used in an amount of 0.7 parts by weight. The water was used in an amount of 250 parts by weight.

The resultant slurry was coated on the inner peripheral surface of the mantle 40 and the outer peripheral surface and inner peripheral surface of the cylinder-shaped supports 20, 30 and 30. Note that the coating amount was 90 g/m$^2$. Thereafter, the coated slurry was calcined at 500° C. for 1 hour.

In accordance with the above-described procedures, a pipe-shaped exhaust-gas purifying apparatus 10 according to Example No. 1 was manufactured. FIG. 1 illustrates the arrangement of the pipe-shaped exhaust-gas purifying apparatus 10 according to Example No. 1. Note that, in the drawing, the mantle 40 is illustrated with broken lines in order to make the dispositions of the cylinder-shaped supports 20, 30 and 30 noticeable in the pipe-shaped exhaust-gas purifying apparatus 10 according to Example No. 1.

Example No. 2

Except that a perforated pipe was used to prepare nine cylinder-shaped supports 21, 31 and 31 which were disposed in a mantle 41, a pipe-shaped exhaust-gas purifying apparatus 11 according to Example No. 2 was manufactured in the same manner as Example No. 1.

Specifically, in the pipe-shaped exhaust-gas purifying apparatus 11 according to Example No. 2, the nine cylinder-shaped supports 21, 31 and 31 which were fastened in the mantle 41 were made of a perforated steel pipe, respectively. In each set of the three cylinder-shaped supports 21, 31 and 31 which are disposed at the same axial position in the mantle 41 only the cylinder-shaped support 21 was provided with a letter "C"-shaped axially vertical cross-section.

Figure 2:
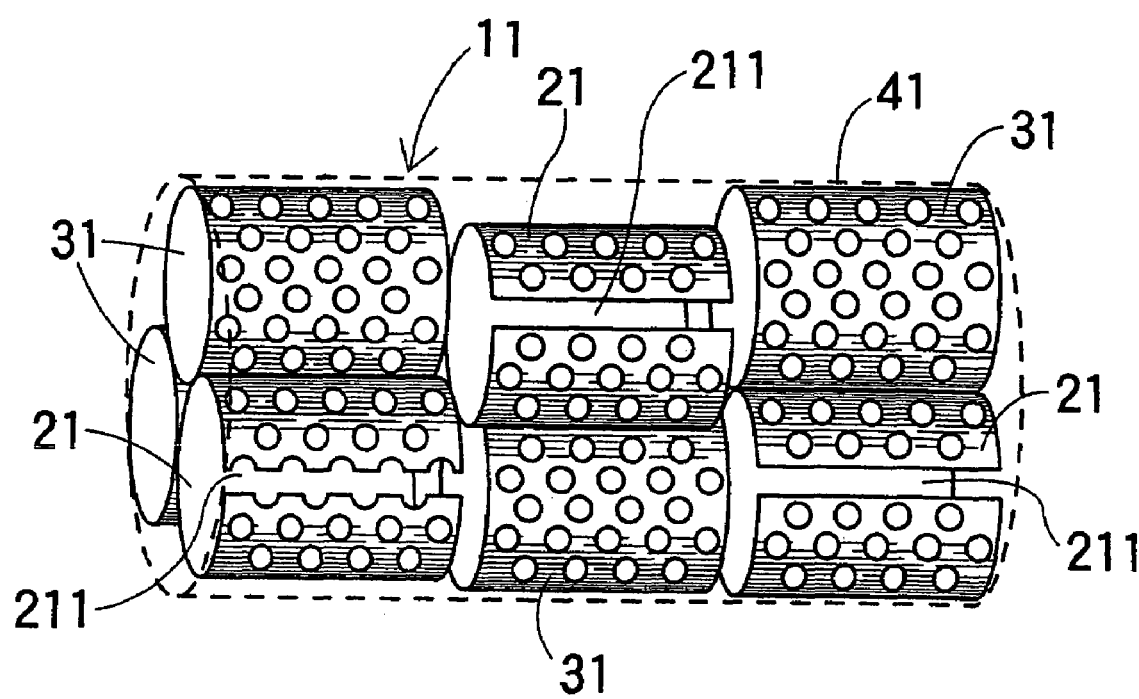
FIG. 2 is a drawing for illustrating the arrangement of an exhaust-gas purifying apparatus according to Example No. 2 of the present invention.

FIG. 2 illustrates the arrangement of the pipe-shaped exhaust-gas purifying apparatus 11 according to Example No. 2. Note that, in the drawing, the mantle 41 is illustrated with broken lines in order to make the dispositions of the cylinder-shaped supports 21, 31 and 31 noticeable in the pipe-shaped exhaust-gas purifying apparatus 11 according to Example No. 2.

When manufacturing the pipe-shaped exhaust-purifying apparatuses 10 and 11 according to Example Nos. 1 and 2, it was possible to fit the cylinder-shaped supports into the mantle with ease.

Specifically, when the cylinder-shaped supports 20, 30 and 30 or 21, 31 and 31 were fitted into the mantle 40 or 41, the opening 201 or 211 of the cylinder-shaped support 20 or 21 was contracted. Namely, since the cylinder-shaped support 20 or 21 with a letter "C"-shaped axially vertical cross-section was thus contracted diametrically, the cylinder-shaped supports 20, 30 and 30 or 21, 31 and 31 could be fitted into the mantle 40 or 41 with ease. Moreover, when the cylinder-shaped support 20 or 21 with a letter "C"-shaped axially vertical cross-section was fitted into and positioned in the mantle 40 or 41, a force expanding the cylinder-shaped support 20 or 21 in the centrifugal direction was generated by elastic deformation. Accordingly, the cylinder-shaped support 20 or 21 contacted with the inner peripheral surface of the mantle 40 or 41 by pressure, and contacted with the outer peripheral surface of the cylinder-shaped supports 30, 30 or 31, 31 with a ring-shaped axially vertical cross-section by pressure. In addition, due to the stress exerted from the cylinder-shaped support 20 or 21 with a letter "C"-shaped axially vertical cross-section, the two cylinder-shaped supports 30, 30 or 31, 31 with a ring-shaped axially vertical cross-section contacted with the inner peripheral surface of the mantle 40 or 41 by pressure, and contacted with the outer peripheral surface of the neighboring cylinder-shaped supports 20, 30 or 21, 31 by pressure.

Moreover, when the cylinder-shaped supports were fitted into and disposed in the mantle, the cylinder-shaped supports fastened of themselves to the mantle. Accordingly, in the brazing operation, it was not needed to temporarily fasten the cylinder-shaped supports to the mantle. Consequently, it was possible to sharply reduce the costs for manufacturing the pipe-shaped exhaust-purifying apparatuses 10 and 11 according to Example Nos. 1 and 2.

Comparative Example No. 1

An exhaust-gas purifying apparatus according to Comparative Example No. 1 was manufactured in the following manner. A round pipe was prepared whose outside diameter was φ 42.7 mm, length was 90 mm, and thickness was 1.2 mm, and which was composed of SUS304 (as per JIS). The round pipe was provided with a catalytic layer on the inner peripheral surface in the same manner as Example No. 1.

Comparative Example No. 2

An exhaust-gas purifying apparatus according to Comparative Example No. 2 was manufactured in the following manner. A perforated pipe was prepared whose outside diameter was φ 28.6 mm, length was 90 mm, and thickness was 1 mm, and which was composed of SUS304 (as per JIS). The perforated pipe was provided with a catalytic layer on the entire inner and outer peripheral surfaces in the same manner as Example No. 1. Note that, in the exhaust-gas purifying apparatus according to Comparative Example No. 2, the perforated pipe was fastened coaxially in a mantle whose outside diameter was φ 42.7 mm and thickness was 1.2 mm.

Reference Example No. 1

First of all, a cylinder-shaped support 22 whose axially vertical cross-section was formed as a letter "C" shape was manufactured in the following manner. A round pipe was prepared. The round pipe had an outside diameter of φ 19 mm, a length of 90 mm and a thickness of 0.6 mm, and was composed of SUS304 (as per JIS). The round pipe was cut off at a portion in the peripheral wall continuously in the axial direction, thereby forming an opening 221. Note that the opening 221 had a peripheral length of 2 mm.

Then, two cylinder-shaped supports 32, 32 whose axially vertical cross-section was formed as a ring were prepared. The cylinder-shaped supports 32, 32 had an outside diameter of φ 19 mm, a length of 90 mm and a thickness of 0.6 mm, and were composed of SUS304 (as per JIS). Moreover, a mantle 42 was prepared. The mantle 42 had an outside diameter of φ 42.7 mm, a length of 90 mm and a thickness of 1.2 mm, and was composed of SUS304 (as per JIS). Together with the cylinder-shaped support 22 whose axially vertical cross-section was formed as a letter "C" shape, the two cylinder-shaped supports 32, 32 whose axially vertical cross-section was formed as a ring shape were fitted into the mantle 42.

Subsequently, in the same manner as Example No. 1, the cylinder-shaped supports 22, 32 and 32 were brazed with each other, were brazed to the mantle 42 as well, and were thereafter provided with a catalytic layer, respectively.

Figure 3:
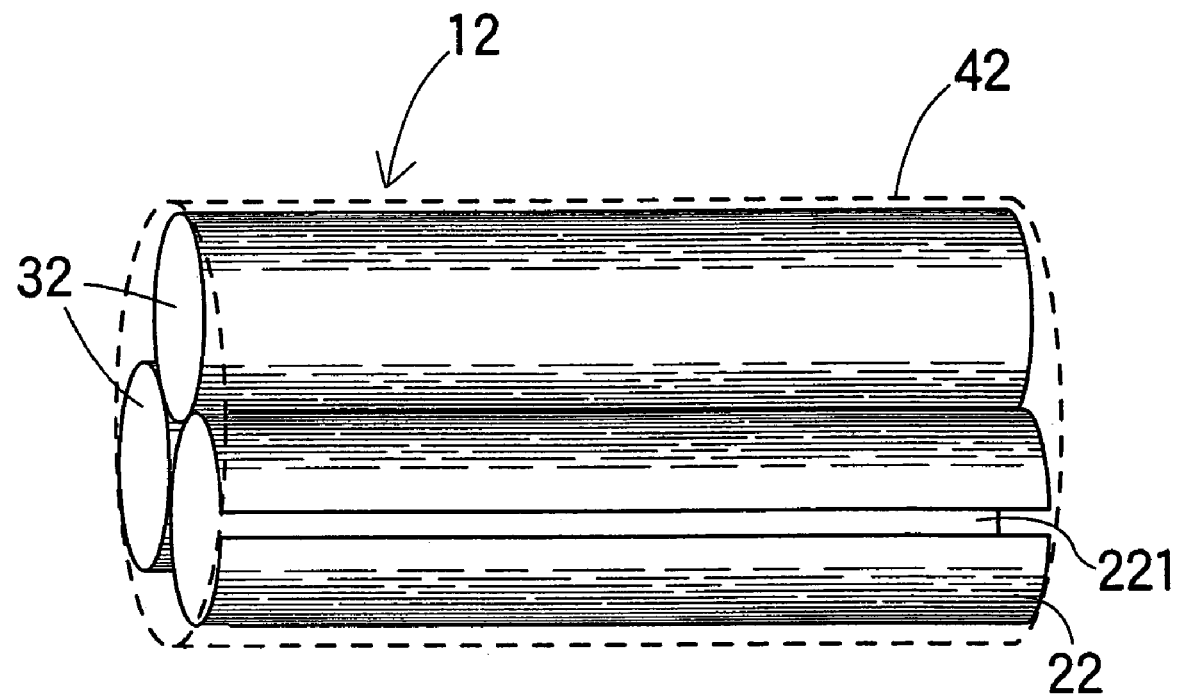
FIG. 3 is a drawing for illustrating the arrangement of an exhaust-gas purifying apparatus according to Reference Example No. 1.

In accordance with the above-described procedures, a pipe-shaped exhaust-gas purifying apparatus 12 according to Reference Example No. 1 was manufactured. FIG. 3 illustrates the arrangement of the pipe-shaped exhaust-gas purifying apparatus 12 according to Reference Example No. 1. Note that, in the drawing, the mantle 42 is illustrated with broken lines in order to make the dispositions of the cylinder-shaped supports 22, 32 and 32 noticeable in the pipe-shaped exhaust-gas purifying apparatus 12 according to Reference Example No. 1.

Reference Example No. 2

Except that a perforated steel pipe was used to prepare three cylinder-shaped supports 23, 33 and 33 which were disposed in a mantle 43, a pipe-shaped exhaust-gas purifying apparatus 13 according to Reference Example No. 2 was manufactured in the same manner as Reference Example No. 1.

Specifically, in the pipe-shaped exhaust-gas purifying apparatus 13 according to Reference Example No. 2, the three cylinder-shaped supports 23, 33 and 33 which were fastened in the mantle 43 were made of a perforated steel pipe, respectively. One of the cylinder-shaped supports 23, 33 and 33, the cylinder-shaped support 23, was provided with a letter "C"-shaped axially vertical cross-section.

Figure 4:
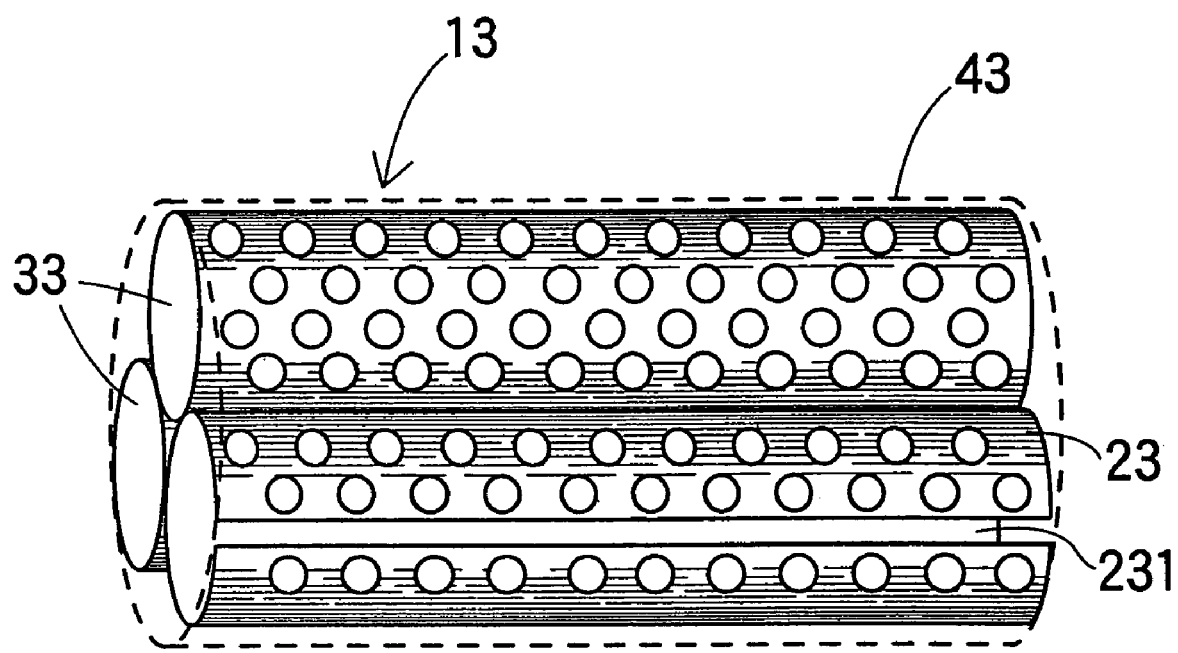
FIG. 4 is a drawing for illustrating the arrangement of an exhaust-gas purifying apparatus according to Reference Example No. 2.

FIG. 4 illustrates the arrangement of the pipe-shaped exhaust-gas purifying apparatus 13 according to Reference Example No. 2. Note that, in the drawing, the mantle 43 is illustrated with broken lines in order to make the dispositions of the cylinder-shaped supports 23, 33 and 33 noticeable in the pipe-shaped exhaust-gas purifying apparatus 13 according to Reference Example No. 2.

Assessment on Exhaust-Gas Purifying Ability

Figure 5:
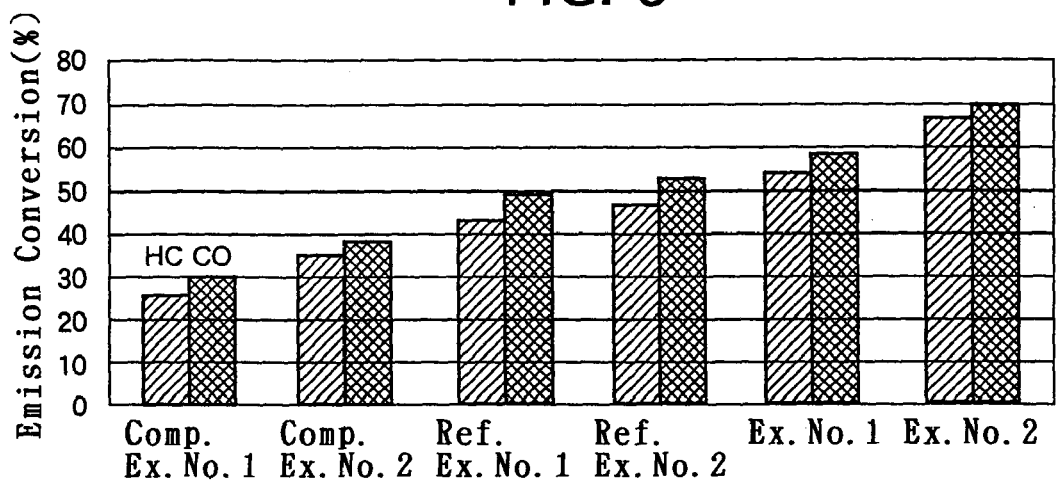
FIG. 5 is a graph for illustrating the results of an exhaust-gas purifying test on the exhaust-gas purifying apparatuses according to Example Nos. 1 and 2, Reference Example Nos. 1 and 2 and Comparative Example Nos. 1 and 2.

In order to assess the exhaust-gas purifying ability of the pipe-shaped exhaust-gas purifying apparatuses according to Example Nos. 1 and 2, Comparative Example Nos. 1 and 2 and Reference Example Nos. 1 and 2, the respective pipe-shaped exhaust-gas purifying apparatuses were installed to an exhaust system of a scooter, and were subjected to an exhaust-gas purifying test to examine the emission conversions. FIG. 5 illustrates the results of the examination.

Specifically, the exhaust-gas purifying test was carried out in the following manner. The respective pipe-shaped exhaust-gas purifying apparatuses according to Example Nos. 1 and 2, Comparative Example Nos. 1 and 2 and Reference Example Nos. 1 and 2 were installed to an exhaust system of a scooter on which a 4-stroke engine was boarded. The engine had a displacement of 0.125 L (or 125 cc). The engine was driven under the EC-40 mode, and exhaust gases emitted therefrom were purified by the exhaust-gas purifying apparatuses. Thus, the exhaust-gas purifying apparatuses were examined for the exhaust-gas purifying ability.

It is understood from FIG. 5 that the pipe-shaped exhaust-gas purifying apparatuses according to Example Nos. 1 and 2 exhibited much higher HC and CO conversions than those of the pipe-shaped exhaust-gas purifying apparatuses according to Comparative Example Nos. 1 and 2. Moreover, it is appreciated from the comparison between Example No. 1 and Example No. 2 that the conversions were furthermore improved when the cylinder-shaped supports were made of the perforated steel pipe.

In addition, it is recognized from the comparison between Example No. 1 and Reference Example No. 1 as well as the comparison between Example No. 2 and Reference Example No. 2 that the pipe-shaped exhaust-gas purifying apparatuses according to Example Nos. 1 and 2, whose support comprised a plurality of the cylinder-shaped supports or support elements disposed at predetermined intervals in the axial direction of the mantle, showed higher conversions than those of Reference Example Nos. 1 and 2.

Comparative Example No. 3

An exhaust-gas purifying apparatus according to Comparative Example No. 3 was manufactured in the following manner. A metallic honeycomb-shaped support was made of a mantle, a corrugated foil, and a flat foil. The mantle had an outside diameter of $\phi$ 42.7 mm, a length of 90 mm and a thickness of 1.2 mm, and was composed of SUS436L (as per JIS). The corrugated and flat foils had a thickness of 0.1 mm, and were composed of 20Cr-5Al heat-resistant steel. The metallic honeycomb-shaped support had 15.5 cells per 1 $cm^2$ (i.e., 100 cells/$in^2$ approximately). The metallic honeycomb-shaped support was provided with a catalytic layer in the same manner as Example No. 1.

Assessment on Misfire Resistance

In order to further asses the present exhaust-gas purifying apparatus, the exhaust-gas purifying apparatuses according to Example No. 2 and Comparative Example No. 3 were subjected to a misfire resistance test. The misfire resistance test was carried out as hereinafter described. The respective exhaust-gas purifying apparatuses were installed to an exhaust system of a motorbike on which a 4-stroke engine was boarded. The engine had a displacement of 0.400 L (or 400 cc). The engine was driven under a constant-speed condition, i.e., at a speed of 60 km/h (or at the 4th speed, or at 3,600 rpm), and was thereafter stopped compulsorily by turning off the ignition switch. Thus, a misfire occurred. In the misfire resistance test, the exhaust-gas purifying apparatuses were assessed when the engine was stopped forcibly once and for all.

Figure 6:
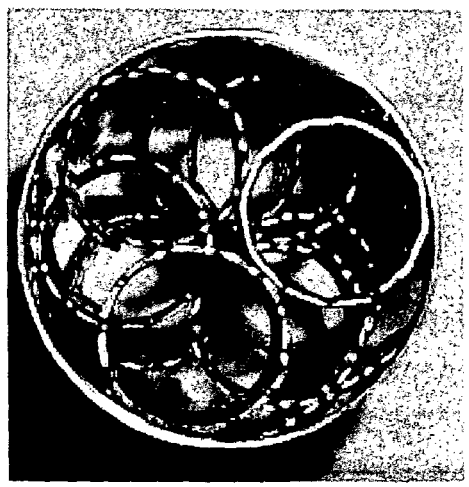
FIG. 6 is an image for depicting an exhaust-gas purifying apparatus according to Example No. 4 after it was subjected to a misfire resistance test.
Figure 7:
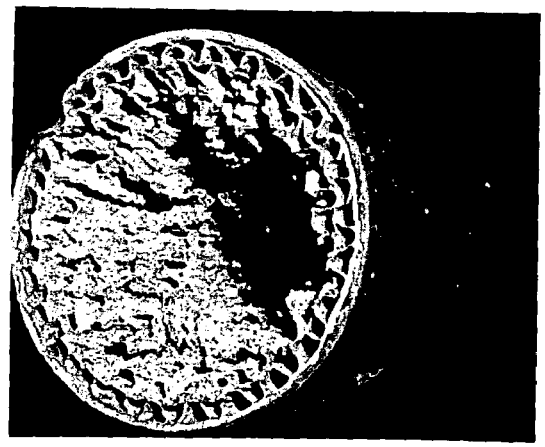
FIG. 7 is an image for depicting an exhaust-gas purifying apparatus according to Comparative Example No. 3 after it was subjected to a misfire resistance test.

Thereafter, the pipe-shaped exhaust-gas purifying apparatuses according to Example No. 2 and Comparative Example No. 3 were removed from the exhaust system of the motorbike, and were examined visually how they were affected by the misfire. The pipe-shape exhaust-gas purifying apparatuses were photographed after the misfire resistance test. FIG. 6 shows the appearance of the pipe-shaped exhaust-gas purifying apparatus 11 according to Example No. 2 after the misfire resistance test. FIG. 7 shows the appearance of the honeycomb-shaped exhaust-gas purifying apparatus according to Comparative Example No. 3 after the misfire resistance test.

It is verified from FIG. 7 that the honeycomb-shaped exhaust-gas purifying apparatus according to Comparative Example No. 3 was melted and damaged by the misfire. On the other hand, as shown in FIG. 6, it is possible to recognize that the pipe-shaped exhaust-gas purifying apparatus 11 according to Example No. 2 was scarcely melted and damaged by the misfire. Specifically, in the honeycomb-shaped exhaust-gas purifying apparatus according to Comparative Example No. 3, the thickness of the foil demarcating the cellular walls was so thin that the cellular walls were melted and damaged by the heat resulting from them is fire. On the contrary, in the pipe-shaped exhaust-gas purifying apparatus 11 according to Example No. 2, the thickness of the cylinder-shaped supports 21, 31 and 31 was so thick that the cylinder-shaped supports 21, 31 and 31 were hardly melted and damaged even when they were exposed to the misfire.

Thus, in the pipe-shaped exhaust-gas purifying apparatus 11 according to Example No. 2, it was possible to provide the cylinder-shaped supports 21, 31 and 31 with a heavy thickness. As a result, the pipe-shaped exhaust-gas purifying apparatus 11 exhibited high misfire resistance.

As described above, the pipe-shaped exhaust-gas purifying apparatuses 10 and 12 according to Example Nos. 1 and 2 showed the high exhaust-gas purifying abilities. Moreover, the pipe-shaped exhaust-gas purifying apparatuses 10 and 12 according to Example Nos. 1 and 2 produced advantages that not only they could be manufactured at reduced costs, but also they exhibited enhanced misfire resistance, because they used the cylinder-shaped supports 20 or 21 with a letter "C"-shaped axially vertical cross-section.

In addition, further embodiments of the present exhaust-gas purifying apparatus, other than the above-described pipe-shaped exhaust-gas purifying apparatuses 10 and 11 according Example Nos. 1 and 2 will be hereinafter described.

Example No. 3

Except that a support 24 comprising three curved stainless steel plates (or support elements) which were curved so that they had a letter "S"-shaped cross-section substantially was used instead of the cylinder-shaped supports 20, 30 and 30, and that the curved stainless steel plates were disposed out of phase, a pipe-shaped exhaust-gas purifying apparatus 14 according to Example No. 3 was manufactured in the same manner as Example No. 1.

For example, to begin with, a first stainless steel plate was cut out, and was curved so that it had a letter "S"-shaped cross-section substantially. The curved first stainless steel plate was compressed in the vertical direction of the letter "S"-shaped cross-section. Then, the compressed first stainless steel plate was fitted into a mantle 44 from one of the opposite opening ends of the mantle 44 (e.g., from the left hand-side opposite opening end in the drawing). Subsequently, a second stainless steel plate which was curved likewise so that it had a letter "S"-shaped cross-section was fitted into the mantle 44 from the left-side opposite opening end of the mantle 44. When the second stainless steep plate was fitted into the mantle 44, it was disposed so that the letter "S"-shaped cross-section was turned about the axis of the mantle 44 by 90 degrees in the counterclockwise direction with respect to the first stainless steel plate.

Thereafter, a third stainless steel plate which was curved likewise so that it had a letter "S"-shaped cross-section was fitted into the mantle 44 from the other one of the opposite opening ends of the mantle 44 (e.g., from the right-side opposite opening end of the mantle 44 in the drawing). When the third stainless steep plate was fitted into the mantle 44, it was disposed so that the letter "S"-shaped cross-section was turned about the axis of the mantle 44 by 90 degrees in the counterclockwise direction with respect to the first stainless steel plate. In this instance, note that the letter "S"-shaped cross-section of the third stainless steel plate was turned about the axis of the mantle 44 by 90 degrees in the counterclockwise direction when it was viewed from the right-side opposite opening end of the mantle 44. Accordingly, when the third stainless steel plate was viewed from the left-side opposite opening end of the mantle 44, the letter "S"-shaped cross-section of the third stainless steel plate was inverted with respect to the letter "S"-shaped cross-section of the first stainless steel plate. Moreover, note that the first, second and third stainless steel plates were disposed at predetermined intervals in the axial direction of the mantle 44.

Finally, in the same manner as Example No. 1, the first, second and third stainless steel plates were brazed to the mantle 44, and were thereafter provided with a catalytic layer, respectively.

Figure 8:
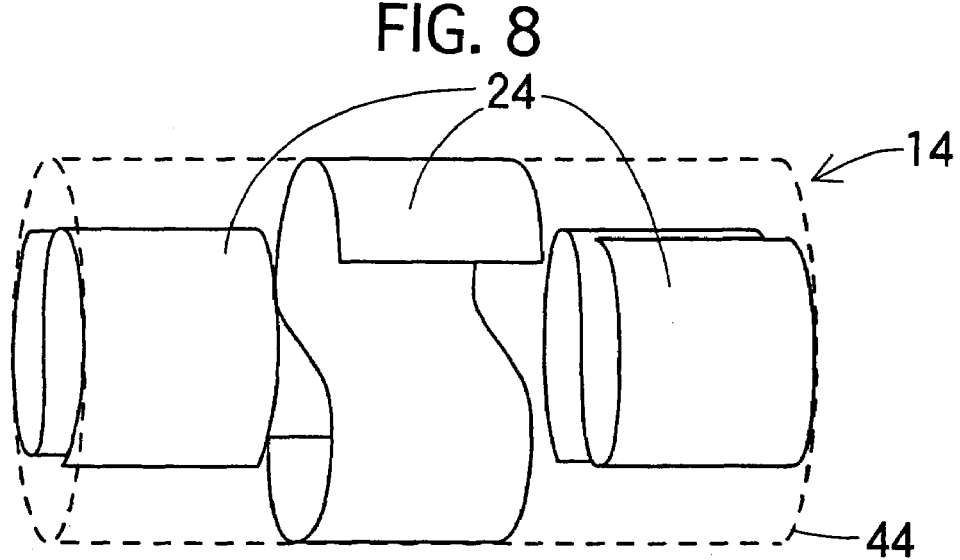
FIG. 8 is a drawing for illustrating the arrangement of an exhaust-gas purifying apparatus according to Example No. 3 of the present invention.

In accordance with the above-described procedures, a pipe-shaped exhaust-gas purifying apparatus 14 according to Example No. 3 was manufactured. FIG. 8 illustrates the arrangement of the pipe-shaped exhaust-gas purifying apparatus 14 according to Example No. 3. Note that, in the drawing, the mantle 44 is illustrated with broken lines in order to make the disposition of the support 24 comprising the first, second and third stainless steel plates noticeable in the pipe-shaped exhaust-gas purifying apparatus 14 according to Example No. 3.

Example No. 4

Except that a support 25 comprising three curved stainless steel plates which were curved so that they had a letter "U"-shaped cross-section substantially was used instead of the support 24 comprising the three curved stainless steel plates whose cross-section was formed as a letter "S" shape substantially, a pipe-shaped exhaust-gas purifying apparatus 15 according to Example No. 4 was manufactured in the same manner as Example No. 3.

For example, to begin with, a first stainless steel plate was cut out, and was curved so that it had a letter "U"-shaped cross-section substantially. The curved first stainless steel plate was compressed in the horizontal direction of the letter "U"-shaped cross-section. Then, the compressed first stainless steel plate was fitted into a mantle 45 from one of the opposite opening ends of the mantle 45 (e.g., from the left hand-side opposite opening end in the drawing). Note that the first stainless steel plate with the letter "U"-shaped cross-section was folded as a curve at the opposite ends of the opening in the letter "U"-shaped cross-section so that the opposite ends demarcating the opening in the letter "U"-shaped cross-section do not contact with an inner peripheral surface of the mantle 45. Subsequently, a second stainless steel plate which was curved likewise so that it had a letter "U"-shaped cross-section was fitted into the mantle 45 from the left-side opposite opening end of the mantle 45. When the second stainless steep plate was fitted into the mantle 45, it was disposed so that the letter "U"-shaped cross-section was turned about the axis of the mantle 45 by 90 degrees in the counterclockwise direction with respect to the first stainless steel plate. Thereafter, a third stainless steel plate which was curved likewise so that it had a letter "U"-shaped cross-section was fitted into the mantle 45 from the other one of the opposite opening ends of the mantle 45 (e.g., from the right-side opposite opening end of the mantle 45 in the drawing). When the third stainless steep plate was fitted into the mantle 45, it was disposed so that the letter "U"-shaped cross-section was turned about the axis of the mantle 45 by 90 degrees in the counterclockwise direction with respect to the first stainless steel plate. In this instance, note that the letter "U"-shaped cross-section of the third stainless steel plate was turned about the axis of the mantle 45 by 90 degrees in the counterclockwise direction when it was viewed from the right-side opposite opening end of the mantle 45. Note that the first, second and third stainless steel plates were disposed at predetermined intervals in the axial direction of the mantle 45.

Finally, in the same manner as Example No. 1, the first, second and third stainless steel plates were brazed to the mantle 45, and were thereafter provided with a catalytic layer, respectively.

Figure 9:
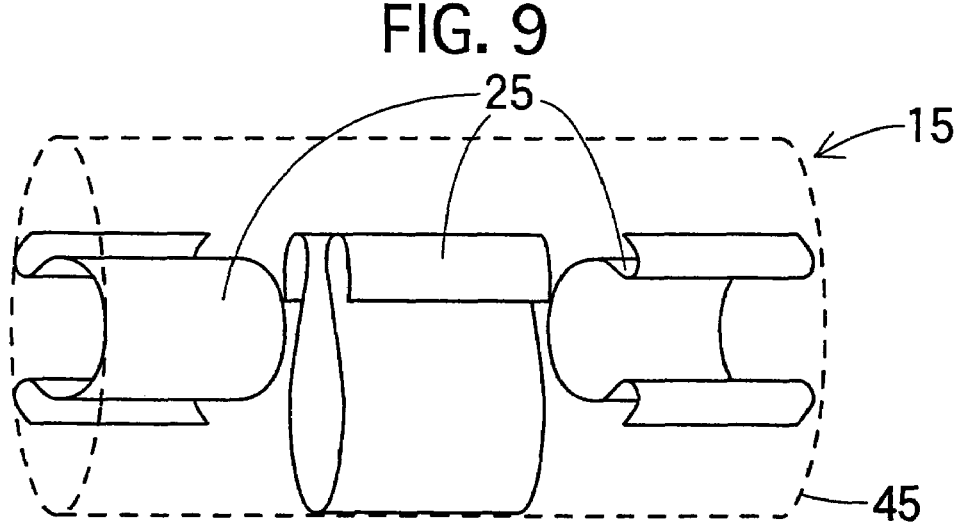
FIG. 9 is a drawing for illustrating the arrangement of the exhaust-gas purifying apparatus according to Example No. 4 of the present invention.

In accordance with the above-described procedures, a pipe-shaped exhaust-gas purifying apparatus 15 according to Example No. 4 was manufactured. FIG. 9 illustrates the arrangement of the pipe-shaped exhaust-gas purifying apparatus 15 according to Example No. 4. Note that, in the drawing, the mantle 45 is illustrated with broken lines in order to make the disposition of the support 25 comprising the first, second and third stainless steel plates noticeable in the pipe-shaped exhaust-gas purifying apparatus 15 according to Example No. 4.

Example No. 5

Except that a support 26 comprising three curved stainless steel plates which were curved so that they had a letter "W"-shaped cross-section substantially was used instead of the support 24 comprising the three curved stainless steel plates whose cross-section was formed as a letter "S" shape substantially, a pipe-shaped exhaust-gas purifying apparatus 16 according to Example No. 5 was manufactured in the same manner as Example No. 3.

Figure 10:
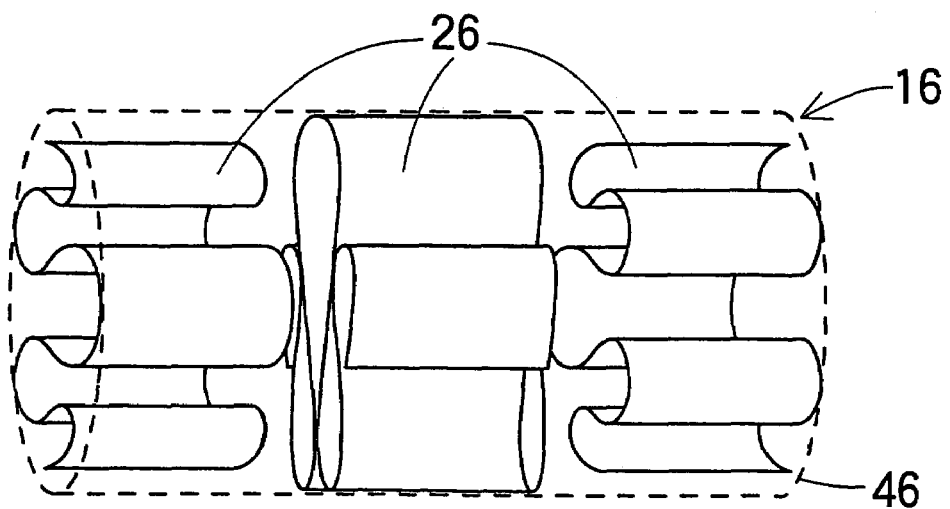
FIG. 10 is a drawing for illustrating the arrangement of an exhaust-gas purifying apparatus according to Example No. 5 of the present invention.

FIG. 10 illustrates the arrangement of the pipe-shaped exhaust-gas purifying apparatus 16 according to Example No. 5. Note that, in the drawing, a mantle 46 is illustrated with broken lines in order to make the disposition of the support 26 comprising the first, second and third stainless steel plates noticeable in the pipe-shaped exhaust-gas purifying apparatus 16 according to Example No. 5.

In the exhaust-gas purifying apparatuses according to Example Nos. 3 through 5 as well, the first, second and third stainless steel plates (i.e., support elements) were disposed out of phase. Accordingly, it is apparent that the exhaust-gas purifying apparatuses exhibited a high exhaust-gas purifying ability.

Having now fully described the present invention, it will be apparent to one of ordinary skill in the art that many changes and modifications can be made thereto without departing from the spirit or scope of the present invention as set forth herein including the appended claims.

What is claimed is:

1. An exhaust-gas purifying apparatus, comprising:
   a mantle;
   a corrugated and substantially "W"-shaped support disposed in the mantle; and
   a catalytic layer loaded on at least one of the surfaces of the support;
   wherein the support comprises at least two support elements that are in contact with and are bonded to an inner peripheral surface of the mantle, the two support elements being disposed in the axial direction of the mantle, and the two support elements neighboring in the axial direction of the mantle being disposed out of phase with each other in the peripheral direction of the mantle; wherein the support comprise three or more support elements, and the three or more support elements are disposed in the mantle at predetermined intervals in the axial direction of the mantle and the three or more supports are disposed out of phase in the axial direction of the mantle.

2. The exhaust-gas purifying apparatus set forth in claim 1, the support elements being metallic.

3. The exhaust-gas purifying apparatus set forth in claim 1, wherein the support elements are formed of a perforated steel plate having a plurality of through holes.

4. The exhaust-gas purifying apparatus set forth in claim 1, wherein the mantle is an exhaust pipe.

* * * * *